INVENTOR.
SHMUEL ELAZAR

Sept. 3, 1968  S. ELAZAR  3,400,284
PIEZOELECTRIC ACCELEROMETER
Filed July 14, 1966  2 Sheets-Sheet 2
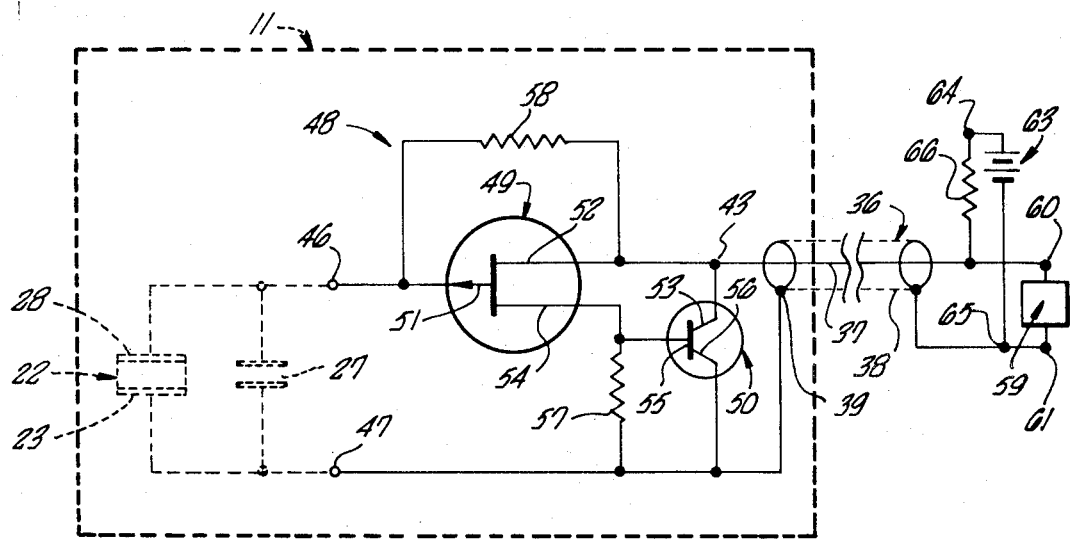
FIG_2_
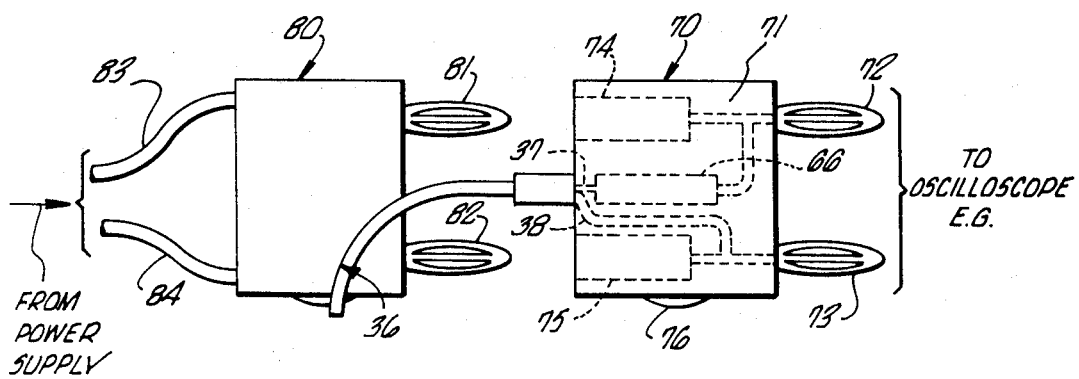
FIG_3_
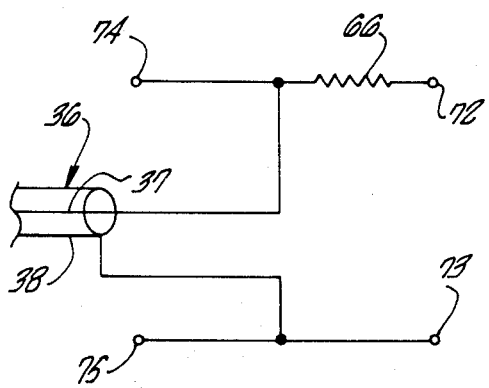
FIG_4_
INVENTOR.
SHMUEL ELAZAR
BY
Christie, Parker & Hale
ATTORNEYS.

United States Patent Office 3,400,284
Patented Sept. 3, 1968

3,400,284
PIEZOELECTRIC ACCELEROMETER
Shmuel Elazar, El Monte, Calif., assignor to Consolidated Electrodynamics Corporation, Pasadena, Calif., a corporation of California
Filed July 14, 1966, Ser. No. 565,144
9 Claims. (Cl. 310—8.4)

This invention relates to piezoelectric transducers which are small in size and mass and which have the feature that the energization and output signals for the transducers are supplied to and derived from the transducer over a single coaxial cable.

Piezoelectric accelerometers are instruments for measuring acceleration by deforming a crystalline body of a semi-metallic or semi-conductive material an amount proportional to the magnitude of an applied force, the material generating an electric charge proportional to the amount of the deformation. The applied acceleration is measured in G units, one G being the value of acceleration of a free falling body at the earth's surface. A piezoelectric material is a material which generates a charge across two opposite surfaces in response to the application of a force tending to deform the material.

Because the signal generated by a piezoelectric instrument is in the form of an electrical charge, the generated signal cannot be conducted to a remote recording device, such as a recording oscillograph, without the risk that electric fields between the instrument and the recording device will have an adverse effect, in the form of unwanted signals or "noise," upon the generated signal. Accordingly, to minimize the presence of noise in the input to a recording device used in conjunction with a piezoelectric accelerometer, it has become the practice to use a special low-noise shielded cable to conduct the transducer output signal to the recording device. Such cables, however, are quite costly, and they are not entirely effective to eliminate or prevent the generation of noise in the signal applied to the recording device.

To avoid the problems associated with the use of costly special shielded cables, the charge generated by the piezoelectric crystal appearing across a high impedance may be converted to a voltage signal appearing across a low impedance, which signal can be transmitted considerable distances by a simple, relative inexpensive coaxial cable. To convert the charge-related signal to a voltage-related signal, amplifying and signal conditioning circuitry is required. When such circuitry is incorporated into the piezoelectric transducer, the voltage-related signal applied to the recording device is considerably freer of noise than where the circuitry is located externally of but close to the transducer. In the past, however, the incorporation of the amplifying and signal conditioning circuitry into the transducer housing has required the use of multi-conductor cables between the transducer and the remote recording device, and such cables require the use of large connectors. The size of the connector used has resulted in the transducer housing being larger and heavier than necessary. Ideally, the transducer housing should be as small and as light as possible consistent with the size of that which it must house.

This invention provides a piezoelectric accelerometer which incorporates, in the transducer housing, the circuitry for converting the charge generated by a piezoelectric crystal to a signal that can be transmitted over a single coaxial cable and for matching the high impedance of the crystal to the much lower input impedance of a recording device with which the transducer is used. The voltage-related signal is supplied from the transducer to the recording device via a coaxial cable which has only a single central conductor and a surrounding conductive shield. A small and simple connector can be used to connect the cable to the transducer housing. As a result, the size of the transducer housing need be only so large as to house the crystal, its acceleration sensitive biasing mechanism, and the necessary impedance matching and signal conditioning circuitry, which circuitry is composed of miniature circuit components and the like. Accordingly, there results a small, lightweight piezoelectric transducer which produces a noise-free output signal and which can be coupled directly to a recording or display device having a low input impedance.

In brief, this invention provides an instrument transducer having a housing in which a piezoelectric device is located for producing an electrical signal when deformed. Also, located in the housing is means movable in response to a force acting on the transducer for deforming the piezoelectric device so that the device generates an electrical signal having a value indicative of the applied force. Circuit means are provided in the housing and are coupled to the piezoelectric device for receiving generated signals from the device and for operating upon the generated signals in a predetermined manner to provide transducer output signals. The transducer also includes connector terminal means carried by the housing. The connector terminal means includes only two terminal elements, each of which is connected conductively to separate locations in the circuit means.

The above-mentioned and other features of the invention are more fully set forth in the following detailed description presented with reference to the accompanying drawing, wherein:

FIG. 2 is an electrical schematic diagram of the transducer shown in FIG. 1;

FIG. 3 is an enlarged elevation view of a power supply and transducer output connector which may be used with the transducer shown in FIG. 1; and FIG. 4 is an electrical schematic diagram of the connector shown in FIG. 3.

Figure 1:
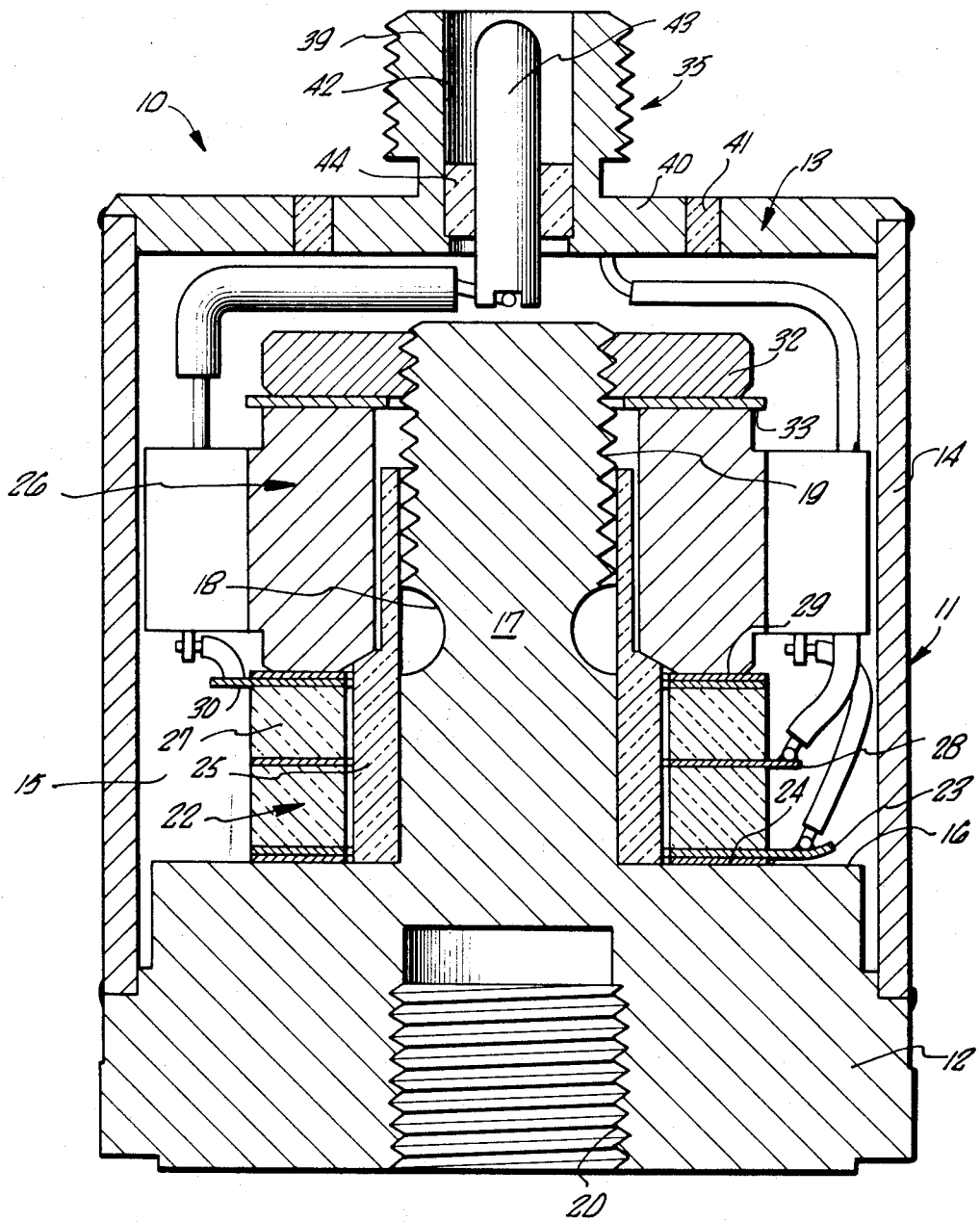
FIG. 1 is an enlarged cross-sectional elevation view of a piezoelectric accelerometer.

FIG. 1 shows a piezoelectric accelerometer 10, an accelerometer being a transducer designed for measuring accelerations. The accelerometer has a housing 11 comprised of a base 12, an end closure 13 and a cylindrical sleeve 14 interconnecting the base and the end closure to define a chamber 15 within the housing. The base defines a substantially planar piezoelectric crystal support surface 16 at one end of chamber 15. An elongated cylindrical pedestal 17 extends perpendicularly from the crystal support surface toward end closure 13 centrally of chamber 15. The pedestal has a reduced diameter portion 18 intermediate its length. The circumference of the pedestal between the reduced diameter portion and the end of the pedestal opposite from surface 16 is externally threaded as at 19. The base is relatively massive so as to be rigid and defines an internally threaded recess 20 open to the end of the housing opposite from end closure 13. An externally threaded stud or the like may be engaged within recess 20 to secure the transducer to a desired structure in which accelerations are to be measured.

An annular piezoelectric crystal 22 is disposed circumferentially of the pedestal and is engaged with the crystal support surface via a conductive electrode and spacer disc 23, and an insulator disc 24. The insulator disc is located between electrode disc 23 and surface 16. The crystal is separated from the pedestal by a sleeve 25 of electrically non-conductive material. An annular seismic mass 26 is disposed above the crystal circumferentially of the pedestal and is spaced from the pedestal by the sleeve 25. An essentially rigid annular capacitor 27, provided to compensate for any variation of the output of crystal 22 with temperature, is disposed between the mass and the crystal. The temperature compensating capacitor is separated from the crystal by a conductive crystal and capacitor electrode disc 28. An insulator disc 29 and a conductive capacitor electrode disc 30 are disposed between the mass and the capacitor, the insulator disc being disposed between the mass and the capacitor electrode disc.

An internally threaded nut 32 is engaged with the upper end of pedestal 17. A washer 33 is positioned between the nut and the adjacent surface of mass 26. The nut is tightened down on the pedestal to bias the mass toward base 12 so that a predetermined compressive load is imposed upon piezoelectric crystal 22, which load determines the normal condition of the crystal. The pedestal and the nut form a compliant mechanism for biasing the mass into operative engagement with the crystal. As accelerations are applied to the housing along the axis of the pedestal, the mass is caused to move toward and away from the crystal thereby increasing and decreasing the loading upon the crystal. As the loading upon the crystal is varied, the crystal is deformed from its normal condition. Since the crystal is fabricated of a piezoelectric material, such deformations cause the crystal to generate electric charges. A given electric charge is manifested as a voltage between electrode discs 23 and 28 because of the intrinsic piezoelectric effect of the crystal and the forces developed on the crystal by the inertial mass 26.

It will be understood that the above-described structure for mounting crystal 22 and mass 26 relative to base 12 is merely one form of compliant mechanism which may be used in a transducer according to this invention. Accordingly, except as specifically delineated in the appended claims, this invention is not restricted to the structure described above.

Housing 11 carries connector terminal means 35 for coupling the transducer to a coaxial cable 36 (see FIG. 2) which has a central conductive wire 37 insulatively disposed within a surrounding conductive shield 38. The connector terminal means includes an externally threaded sleeve 39 carried by a central plug 40 of housing end closure 13. The plug 40 is circumscribed by a quantity of ceramic electrically insulative material 41 which is bonded between the periphery of the plug and the annular remainder of the end closure. Sleeve 39 has an axial bore 42 which communicates through the plug to housing chamber 15. A conductive terminal pin 43 is mounted coaxially of the bore by a quantity of electrically non-conductive ceramic material 44. Terminal pin 43 extends into housing chamber 15 adjacent the upper end of pedestal 17.

Pin 43 and sleeve 39 are both terminal elements for transducer 10 and male elements of a coaxial cable connector (not shown) which is used to couple coaxial cable 36 to the transducer. A suitable coaxial cable connector for use with transducer 10 is a Microdot coaxial cable connector type 32–21–S50.

FIG. 2 is a schematic diagram of the circuitry present in transducer 10. Temperature compensating capacitor 27 is coupled in parallel across crystal 22 and is such that its capacitance varies with temperature substantially in inverse proportion to the variation with temperature of the capacitance of the crystal. The temperature compensating capacitor and the crystal are connected in parallel across input terminals 46 and 47 of a source follower impedance matching amplifier 48 located within housing 11. As illustrated in FIG. 1, the circuit components of amplifier 48 are carried in and around the circumference of seismic mass 26.

The amplifier is provided for matching the high impedance of crystal 22 to the low impedance of a recording or display device such as a recording oscillograph or an oscilloscope coupled to terminals 39 and 43. The amplifier includes a field effect transistor 49 and a junction transistor 50. The gate electrode 51 of the field effect transistor is connected to amplifier input terminal 46. The source electrode 52 of the field effect transistor is connected to transducer output terminal 43, as is the collector electrode 53 of the junction transistor 50. The drain electrode 54 of the field effect transistor is connected to the base 55 of the junction transistor. The emitter electrode 56 of the junction transistor is connected to the input terminal 47 and to the transducer output terminal 39. A biasing resistance 57 is connected between the terminals 39 and 47, on the one hand, and the drain and base of transistors 49 and 50, respectively, on the other hand. A feedback bias resistor 58 is connected between the source and the gate of field effect transistor 49. The output signal of the transducer is derived from the voltage which exists across transducer terminals 39 and 43. The gain of the amplifier as described is between 0.9 and 1.0.

Energization of amplifier 48 is provided externally of transducer 11, preferably at the location where coaxial cable 36 is connected to a readout device 59 having input terminals 60 and 61. A power supply 63, having positive and negative terminals 64 and 65, respectively, is also provided as a part of the measurement system. A load impedance 66 is connected between the power supply positive terminal and the central conductor of coaxial cable 36. In a presently preferred measurement system using a transducer according to this invention, the voltage developed across terminals 64 and 65 is plus 20 volts, and impedance 66 has a value of 5000 ohms.

The components of source following impedance matching amplifier 48 are selected so that substantially no current flows between the source and the gate of field effect transistor 49 via feedback bias resistance 58. Terminals 46 and 43 are points of substantially equal potential and the circuit between these terminals appears to be an open circuit. Amplifier 48 has no reactive components and requires no large "bootstrap" capacitor to maintain the field effect transistor source and gate connections at the same potential. As a result, the amplifier is especially suited for use with a piezoelectric accelerometer since the circuit components can be mounted entirely to seismic mass 26. Preferably, the electrical circuit components of the described amplifier are miniature and micro-miniature elements.

The amplifier described above is more fully described in my copending application Ser. No. 387,059, filed Aug. 3, 1964, for Source Follower.

It is apparent from the foregoing description that transducer terminal 43 is both an amplifier energization terminal and a transducer output terminal; terminal 39 is a common terminal relative to terminal 43 as to both these functions of terminal 43.

FIG. 3 shows a connector 70 which may be used with coaxial cable 36 at the end of the cable remote from the transducer housing. The connector includes a block 71 of insulative material. A pair of banana-type plugs 72 and 73 are mounted to the block in spaced parallel alignment with each other on one side of the block; these plugs may be inserted directly into input and common receptacles of an oscilloscope, for example. The coaxial cable is connected to the side of the block opposite from plugs 72 and 73 between the openings to two receptacles 74 and 75 for banana-type plugs; the receptacles are aligned with and connected to respective ones of plugs 72 and 73. Coaxial cable shield 38 is connected to the common connection of receptacle 75 and plug 73. Central conductor 37 of the coaxial cable is connected, via impedance 66 housed within block 71, to the common connection of receptacle 74 and plug 72. This circuitry is represented schematically in FIG. 4. The shield of the coaxial cable is represented by a lug 76 on the side of block 71 adjacent plug 73.

The leads from a suitable power supply are applied to a similar connector 80 which carries two banana-type plugs 81 and 82 arranged to mate with receptacles 74 and 75 of connector 70. A power supply positive lead 83 is connected to plug 81, and a power supply return or common lead 84 is connected to plug 82.

It will be understood that the structure of transducer 10 may be varied without departing from the scope of the invention. The structure described and illustrated has the feature that the circuitry within the transducer is isolated from ground. If the avoidance of ground loops is not a problem, plug 40 can be made integral with the remainder of end closure 13, and insulator disc 24 may be eliminated.

It will also be apparent that this invention has utility with relation to piezoelectric transducers in general; an accelerometer is described merely for the purposes of illustration and example. For example, the invention can be used in a piezoelectric transient pressure transducer in which a piezoelectric crystal is deformed in proportion to the pressure of a fluid communicated to the transducer.

What is claimed is:

1. An instrument transducer comprising a housing, a piezoelectric device in the housing for producing an electrical signal when deformed from a normal condition thereof, means movable in response to a physical input to the transducer for deforming said device from its normal condition so that the device generates an electrical signal having a value indicative of the value of said input, active circuit means in the housing of such type to require energization thereof from externally of its housing coupled to said device for receiving generated signals from the device and for operating upon the generated signals in a predetermined manner to provide transducer output signals, and connector terminal means carried by the housing and energization and transducer output signal including only two terminal elements each of which is conductively connected to separate locations in said circuit means.

2. In combination with a transducer according to claim 1, a coaxial cable connected at one end thereof to the transducer connector terminal elements, a signal readout device coupled to the other end of the cable for receiving output signals from the transducer, and power supply means connected across the cable between the transducer housing and the readout device.

3. The combination according to claim 2 wherein the transducer circuit means has input terminals coupled across the piezoelectric device and output terminals coupled across the coaxial cable, the circuit means being arranged so that the voltage across the output terminals follows substantially a voltage applied across the input terminals thereof and so that the circuit means appears to define an open circuit between the input and output terminals thereof.

4. The combination according to claim 3 wherein the circuit means includes a field effect transistor having source and gate connections coupled in series between the circuit means input and output terminal means, and an impedance coupled in parallel with said source and gate connections.

5. A transducer according to claim 1 wherein the circuit means comprises input terminal means, output terminal means, a first stage including a field effect device having input and output connections and a single nonreactive feedback path from the output connection to the input connection, a second stage connected to the first stage and including a solid state junction device for amplifying a signal received from the first stage to a predetermined level when a signal is applied to the input thereof, and means for coupling the first and second stages between the input and output terminal means.

6. A transducer according to claim 5 wherein the circuit means includes means for coupling the circuit means input terminal means across the piezoelectric device for receipt by the circuit means of said electrical signals generated by the piezoelectric device, the circuit means output terminal means including a connection to said first stage output connection, and means for coupling the circuit means output terminal means across said transducer terminal elements.

7. A transducer according to claim 5 wherein the movable means for deforming the piezoelectric device includes a seismic mass, and means operatively biasing the mass toward the piezoelectric device, and wherein the circuit means is carried by the mass.

8. In a transducing device having a piezoelectric element mounted within a housing, the combination comprising an active circuit energized from externally of said housing for coupling the piezoelectric element to a low impedance coaxial line, the circuit including input terminal means and output terminal means, means for connecting the input terminal means to the piezoelectric element for supplying signals derived from the element to the circuit, the circuit being arranged so that a voltage at the output terminal means follows substantially the value of a signal applied to the input terminal means and so that the circuit appears to define an open circuit between the input and output terminal means, the circuit being mounted within the housing, and a two terminal coaxial connector mounted on the housing and connected within the housing across the circuit output terminal means.

9. The combination according to claim 8 including a low impedance coaxial line connected to said connector at one end thereof, and a high impedance potential source coupled across the other end of the line for energizing the circuit, the output signal of the transducing device being derived across the coaxial line.

References Cited

UNITED STATES PATENTS

| 3,285,074 | 11/1966 | Elazar | 310—84 |
| 3,283,590 | 11/1966 | Shang | 73—517 |
| 3,241,373 | 3/1966 | Ricketts | 73—503 |
| 2,963,911 | 12/1960 | Pratt | 310—84 |
| 2,857,462 | 10/1958 | Lin | 179—1 |

J. D. MILLER, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,400,284            September 3, 1968

Shumuel Elazar

It is certified that error appears in the above identified patent and that said Letters Patent are hereby corrected as shown below:

Column 5, lines 33 and 34, cancel "energization and transducer output signal" and insert the same after "and" in line 32, same column 5.

Signed and sealed this 19th day of August 1969.

(SEAL)
Attest:

Edward M. Fletcher, Jr.
Attesting Officer

WILLIAM E. SCHUYLER, JR.
Commissioner of Patents

Disclaimer 3,400,284.—*Shmuel Elazar*, El Monte, Calif. PIEZOELECTRIC ACCELEROMETER. Patent dated Sept. 3, 1968. Disclaimer filed Mar. 23, 1970, by the assignee, *Bell & Howell Company*.

Hereby enters this disclaimer to claims 1, 2, 3, 8 and 9 of said patent.
[*Official Gazette July 21, 1970.*]